United States Patent [19]

Mizuhara

[11] Patent Number: 4,590,901

[45] Date of Patent: May 27, 1986

[54] HEAT INSULATED RECIPROCATING COMPONENT OF AN INTERNAL COMBUSTION ENGINE AND METHOD OF MAKING SAME

[75] Inventor: Howard Mizuhara, Hillsborough, Calif.

[73] Assignee: GTE Products Corporation, Stamford, Conn.

[21] Appl. No.: 768,533

[22] Filed: Aug. 22, 1985

Related U.S. Application Data

[62] Division of Ser. No. 495,848, May 13, 1983.

[51] Int. Cl.$^4$ .................................................. F16J 1/04
[52] U.S. Cl. .................................. 123/193 P; 123/669; 92/212; 92/231
[58] Field of Search ............... 123/193 P, 668, 669, 123/188 AA; 92/176, 212, 224, 231, 260, 248, 249, 222; 29/156.5 R, DIG. 4

[56] References Cited

U.S. PATENT DOCUMENTS

| | | | |
|---|---|---|---|
| 1,407,202 | 2/1922 | Kubler | 92/224 |
| 1,462,654 | 7/1923 | Philip | 92/212 |
| 1,593,265 | 7/1926 | Kunze | 92/212 |
| 1,700,604 | 1/1929 | Wagener | 92/231 |
| 1,903,216 | 1/1931 | Hewitt | 92/176 |
| 3,408,995 | 11/1958 | Johnson | 123/668 |
| 3,613,521 | 10/1971 | Itano | 92/231 |
| 4,242,948 | 1/1981 | Stang et al. | 92/176 |
| 4,245,611 | 1/1981 | Mitchell et al. | 92/176 |
| 4,404,935 | 9/1983 | Kraft | 92/224 |
| 4,433,616 | 2/1984 | Hauser | 92/190 |
| 4,524,498 | 6/1985 | Hartsock | 92/212 |
| 4,538,562 | 9/1985 | Matsui et al. | 92/212 |

*Primary Examiner*—Craig R. Feinberg
*Assistant Examiner*—David A. Okonsky
*Attorney, Agent, or Firm*—Donald R. Castle

[57] ABSTRACT

A heat insulated reciprocating component, such as a piston or a valve, for an internal combustion engine comprises a main component body and a ceramic member secured to the body by interference fit with a metal connector which is brazed to the body. In one embodiment, the main body of a piston has an outwardly opening cavity, a ceramic member in the cavity having an annular groove, and a ring seated in the groove and brazed to side of the cavity. In another embodiment, the combustion wall defining face of the valve has a ceramic member mounted thereon, and metal ring in overlapping engagement with the periphery of the member and brazed to the body of the valve. The invention also comprehends the method of making such a component by applying a metal ring in overlapping engagement with the periphery of a ceramic member, mounting a brazing alloy shim on the ring, assembling these parts on the combustion chamber end of the component, and brazing the ring to the component.

4 Claims, 10 Drawing Figures

HEAT INSULATED RECIPROCATING COMPONENT OF AN INTERNAL COMBUSTION ENGINE AND METHOD OF MAKING SAME

This application is a division of application Ser. No. 495,848, filed May 13, 1983.

BACKGROUND OF THE INVENTION

This invention relates to improvements in the structure of and method of making heat insulated pistons and valves for internal combustion engines such as gasoline and diesel engines.

The efficiency of internal combustion engines, and in particular diesel engine, is improved by retaining heat from the ignited fuel in the combustion chamber of the cylinder by minimizing heat loss through the piston. This has been done in the past by insulating the piston and valve heads by various techniques described below. A problem with these techniques, however, has been high manufacturing costs and the strength and durability of the bond between the ceramic member and the metal piston or valve. To date no reliable bond between curved surfaces of the ceramic member and the metal component has been devised.

U.S. Pat. No. 4,242,948 describes a piston which uses a metal bolt to attach a ceramic cap to the piston body. The metal bolt, however, expands during operation and tends to loosen the connection of the cap to the piston. Any ceramic chip between the cap and the piston will force the cap to break when the engine cools to room temperature and the bolt shrinks.

Another proposal is to shrink fit a carefully ground ceramic liner into a steel piston cap. This construction is susceptible to failure from ceramic cracks due to the irregular shear force which exceeds the mechanical property of the ceramic material.

U.S. Pat. No. 4,245,611 describes a piston which has a ceramic insert cast into a cavity in the piston body. This technique is limited to pistons having bodies with high melting temperatures and precludes the use of cast iron pistons. In addition, differential thermal coefficients of expansion between the ceramic and metal body tend to shrink the metal to a greater degree than the ceramic and cause damage to the parts.

In general, success in insulating pistons with ceramic material has been limited because of the difficulty of attaching the ceramic piece to the metal piston body without stressing the ceramic piece during the manufacturing process or operation of the engine.

OBJECTS AND SUMMARY OF THE INVENTION

A general object of the invention is the provision of a heat insulated piston or valve which may be produced at a reasonable cost.

A further object is the provision of such a piston or valve in which the ceramic member is securely locked to the piston body without unduly stressing the ceramic material.

· A further object is the provision of a heat insulated piston having a ceramic heat barrier attached to a cast iron piston body.

Another object is the provision of an improved economical method of making heat insulated pistons and valves for internal combustion engines.

These and other objects of the invention are achieved with a piston or valve having a metal body, a ceramic member mounted on the body to define part of the combustion chamber wall, and an annular metal connector in locking engagement with the ceramic member and brazed to the body of the piston or valve. The invention also includes the method of making such a component by applying a metal ring to the periphery of the ceramic member, assembling the member and ring with the component and thereafter brazing the ring to the body of the component.

DESCRIPTION OF PREFERRED EMBODIMENTS

Figure 1:
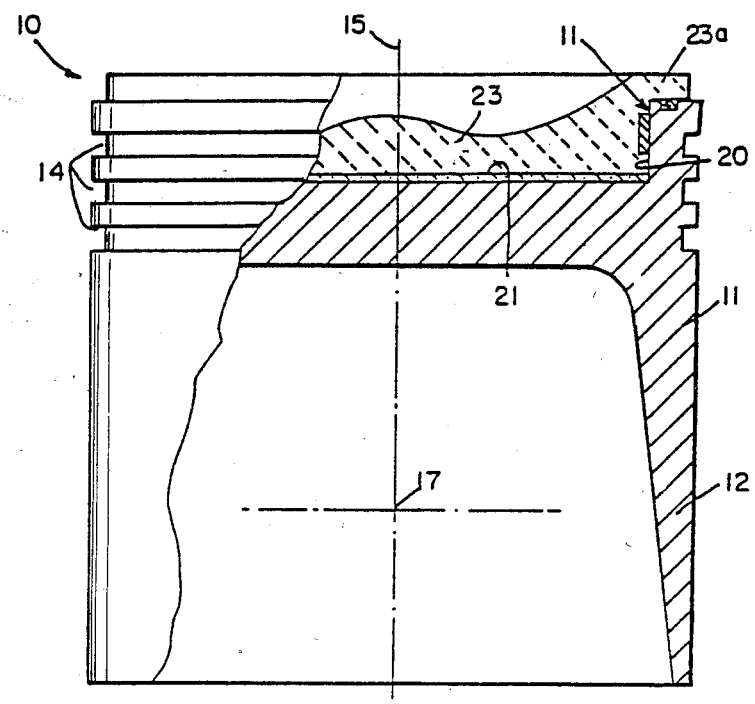
FIG. 1 is an elevation partly in section of a piston embodying the invention utilizing a single connector ring.
Figure 2:
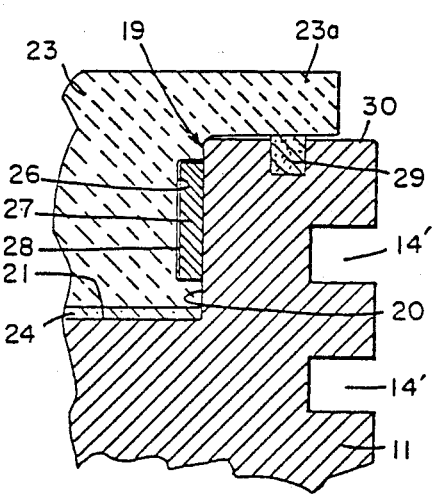
FIG. 2 is an enlarged view of part of FIG. 1 showing details of construction.

Referring now to the drawings, FIGS. 1 and 2 show one component of an internal combustion engine, a piston 10 having a cast iron body 11 with a downwardly extending skirt 12 and annular recesses 14 on the upper body portion for seating conventional oil sealing piston rings, now shown. The piston has a longitudinal axis 15 and is connected to a piston pin, not shown, along transverse axis 17.

The outer or upper (as viewed) portion of piston 10 has an outwardly opening coaxial cavity 19 having a cylindrical side wall 20 and a flat bottom wall 21. A ceramic member 23, such as partially stabilized zirconia (PBZ) is disposed in cavity 19 and fits snugly against side wall 20, and optionally a graphite cloth 24 is placed between bottom wall 21 and member 23 as an additional heat barrier.

In order to lock member 23 tightly in cavity 19, an annular groove 26 is formed in member 23 so that the groove is opposite cavity sidewall 20 when the member is fully seated in the cavity. A ring 27 adapted to fit snugly in groove 26 is brazed to the adjacent portion of cavity sidewall 20. A slight clearance 28 between the inside of groove 26 and ring 27 is provided to compensate for differential coefficients of expansion of member 23 and ring 27. In order to prevent combustion residue from contaminating the assembly, an annular gasket 29 of suitable material such as graphite fiber is disposed between the upper edge 30 of piston body 11 and lip 23a of member 23 that abuts against that edge.

By way of example, a ceramic member 23 composed of SNW-2000 silicon nitride manufactured by WESGO Division of GTE Products Corporation is formed with a groove 26 by machining with a sufficient radius at all corners to minimize stress. A 1010 steel ring 27 is forced tightly into groove 26. A 2 mil by 1" wide copper-manganese-nickel foil such as Nicuman 37 (in weight percent 52.5 Cu, 38 Mn, 9.5 Ni) manufactured by WESGO Division of GTE Products Corporation is cut to fit along sidewall 20 of cavity 19. The main body of piston 10 is made of cast iron. Preformed ceramic member 23 is forced into cavity 19 and ring 27 presses outwardly and tightly against the alloy lined sidewall 20. The entire assembly is then placed in a vacuum furnace and heated to 1050° C. for 20 minutes and thereafter cooled. Ring 27 is brazed to the cavity wall and securely locks member 23 in place on the end of the piston to form the combustion wall defining portion thereof.

Figure 3:
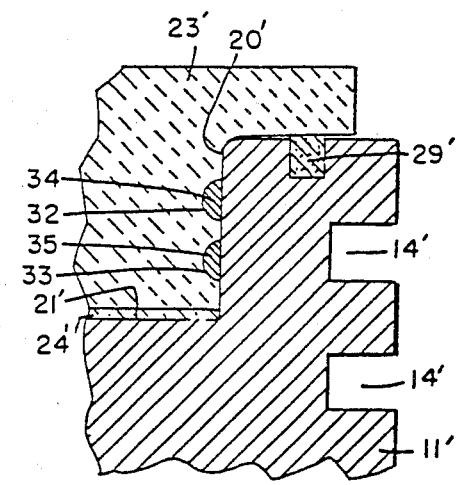
FIG. 3 is a view similar to FIG. 2 showing a modified form of the invention showing a piston with a double connector ring construction.

A modified form of the invention shown in FIG. 3 is substantially the same as that described above except that member 23' has two annular semi-circularly shaped grooves 32 and 33 engaged by similarly shaped rings 34 and 35, respectively, which are brazed to sidewall 20' of the cavity. In other respects this form of the invention is the same as that described above, like parts being indicated by the primes of the reference characters on the drawings.

Figure 4:
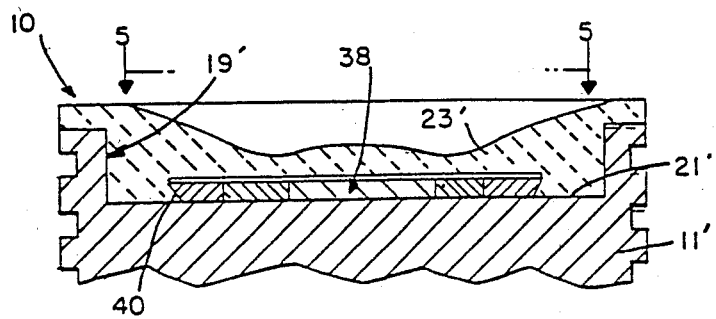
FIG. 4 is a transverse section of a piston embodying another form of the invention using a segmented connector plate.
Figure 5:
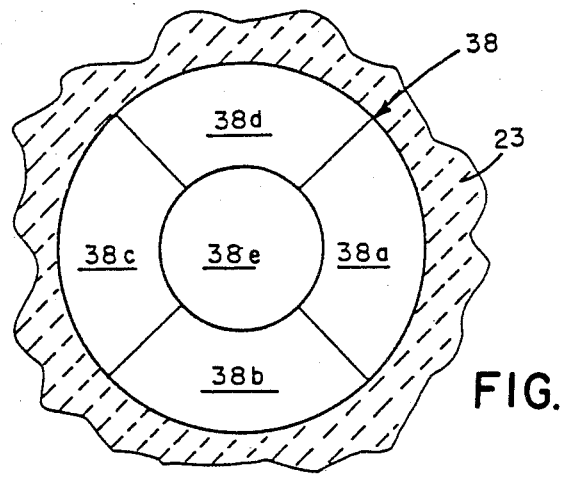
FIG. 5 is a section taken on line 5—5 of FIG. 4.

In the embodiments shown in FIGS. 4 and 5, ceramic member 23' is secured within cavity 19' of piston body 11' by a segmented metal plate 38 brazed to the bottom wall 21' of the cavity and extending into a recess 40 formed in the bottom of member 23'. Recess 40 preferably has an outwardly diverging truncated conical shape as does plate 38. Thus member 23' is tightly secured within cavity 19' by plate 38.

Plate 38 has four arcuate quadrant-type segments 38a, 38b, 38c and 38d surrounding a circular segment 38e, all segments being contiguous and in abutting relation.

Prior to assembly of piston 10', recess 40 is machined into the underside of ceramic member 23'. Segments 38a–38d, inclusive, are next inserted into the recess tightly against the periphery thereof and circular segment 38e is thereafter inserted. The preform of Nicuman 37 alloy is placed between plate 38 and bottom wall 21' of the cavity and the assembly is brazed in a vacuum furnace at 1050° C. under $10^{-5}$ mm Hg vacuum. The brazing material secures the segments of plate 38 together and to bottom wall 21' of the cavity which tightly lock member 23' in place. A slight clearance between the top of plate 38 and recess 40 is provided to compensate for thermal expansion differences.

Figures 6, 7:
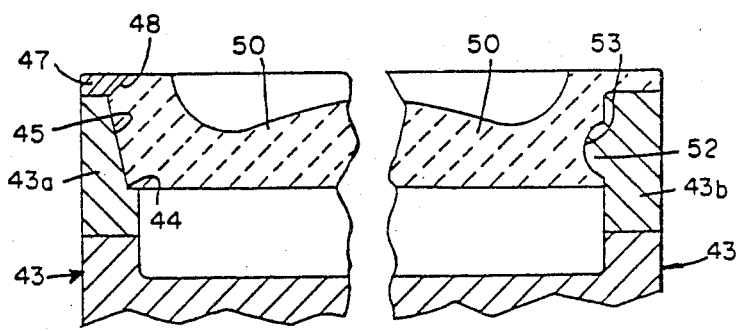
FIGS. 6 and 7 are sections of parts of the upper portions of pistons showing alternate forms of the invention.

The embodiments of the invention shown in FIGS. 6 and 7 utilize an open top piston design defined by a cylindrical cast iron body 43. Such a piston configuration permits uniform deformation of the upper piston rim within the elastic limit of the metal. Since the major force is always axially downward on the piston, the ceramic member is tightly confined in the support area and manufacture of the piston embodiments shown in FIGS. 6 and 7 is substantially simplified.

As shown in FIG. 6, the upper portion of piston body 43 comprises a metal 43a collar having an inner shoulder 44 and an outwardly diverging conical surface 45 extending upwardly from the shoulder. A ring 47 secured by brazing or welding to the top of body portion 43a has an upwardly converging conical surface 48. Ceramic member 50 similar to ceramic member 23 described above, is seated on shoulder 44 as shown and is engaged by surfaces 45 and 48 to securely lock the member in place. The portion of the piston body within collar 43a and ring 47 is the support area for member 23. This design permits selection of collar 43a and ring 47 having a thermal coefficient of expansion matched that of ceramic member 50 and thus insures a tight mechanical bond between these parts at all temperatures. The piston is usually made from cast iron because of the low casting temperature and ease of machining, but cast iron is a poor material to weld. By selecting collar 43a from an iron nickel alloy with low thermal expansion, such as Alloy 42 (in weight percent 42 Ni, 58 Fe), the collar may be brazed to the lower cast iron body after brazing ring 47 to collar 43a and bonding member 50 to the collar.

As shown in FIG. 7, collar 43b has an annular rounded inwardly extending ridge 52 which engages the correspondingly shaped groove in member 53. Collar 43b is sufficiently heated to permit force fitting of ceramic member 50 into the collar such that at operating temperatures there is no play and at room temperature the compressive loading does not damage the ceramic member.

The use of closely thermal expansion-matched metal collar 43b around ceramic member 50 followed by bonding as by brazing to the lower piston body with a higher thermal expansion forms a gradient attachment, thereby minimizing the stress gradient. While welding of cast iron is difficult to achieve, brazing of cast iron is easily accomplished. Thus collar 43b is readily bonded to the lower piston body portion.

Figures 8, 9:
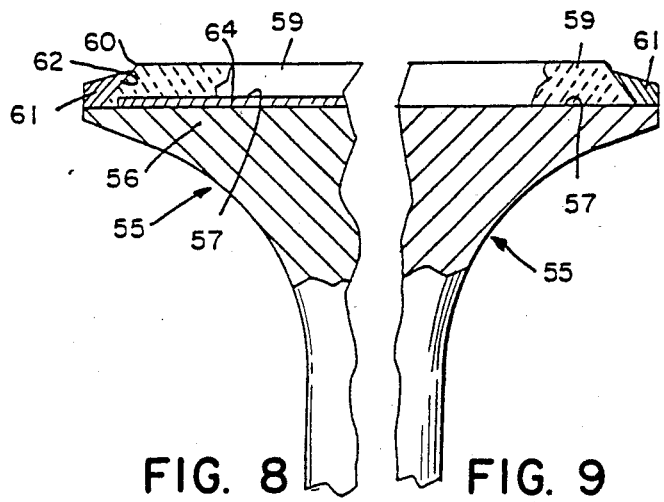
FIGS. 8, 9 and 10 are side elevations partly in section of valves embodying alternate forms of the invention.

FIG. 8 illustrates a valve 55 comprising a valve body 56 having a flat top face 57, a ceramic member 59 in the form of a disk having an inwardly and outwardly tapering peripheral edge 60, and a steel retaining ring 61 adjacent to the peripheral portion of said face 57 and having an inwardly and outwardly tapered surface 62 engaging the tapered edge 60 of member 59. In addition a ductile spacer layer 64, such as nickel, is disposed between member 59 and valve body face 57 in order to compensate for the thermal expansion differences between member 59 and body 56. Brazing material such as foil sheets are placed on opposite sides of spacer layer 64 and between ring 61 and valve face 57 and the assembly is then brazed simultaneously to secure the parts together. The alloy used for brazing both ceramic member 59 to spacer alloy 64 and steel ring 61 to valve face 57 preferably is the same, and may be, for example, a copper-titanium alloy (in weight percent 98 Cu, 2 Ti). Brazing of this assembly is accomplished at approximately 1100° C. in a $10^{-5}$ mm Hg vacuum furnace.

FIG. 9 shows a valve construction similar to that of FIG. 8 except for omission of the filler alloy, like parts being indicated by like referene characters on the drawings. Ceramic member 59 is held in place by steel retainer ring 61. A brazing alloy perform, preferably a nickel base alloy sold as Nibsi (in weight percent 94.5 Ni, 2B, 3.5 Si) by WESGO Division of GTE Products Corporation, is placed between ring 61 and the periphery of face 57. The temperature is maintained at the braze level for 15 minutes to permit the boron component of the alloy to diffuse away from the joint and produce a brazed joint with higher melting temperature. The brazing is carried out at 1070° C. under a vacuum of $10^{-5}$ mm Hg for about 20 minutes and thereafter is cooled.

Figure 10:
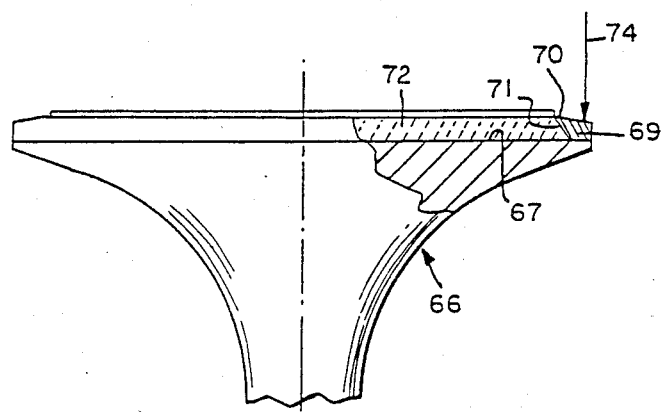

FIG. 10 shows a valve assembly 66 similar to that shown in FIG. 9 having an upper face 67, a steel retainer ring 69 with a thin lip 70 engaging the tapered side 71 of ceramic member 72. Ceramic member 72 is retained on valve face 67 by applying a large downward force to ring 69 as indicated by arrow 74 to thereby distort lip 70 against member 72, and simultaneously securing ring 69 to face 67 by laser or electron beam welding. Ring 69 is distorted within the elastic limit of the steel such that during actual engine operating conditions, ring 69 will expand greater than member 72 but will still maintain minimal compressive loading on the ceramic member.

The use of concentrated narrow beam welding while rotating the valve about its axis limits the overall temperature rise, thereby leaving the ceramic member 72 in compression at room temperature. Another important aspect of this welding technique is that beam diameter and penetration depth is carefully controlled and monitored. In addition such welding does not distort the valve stem which is likely to occur under furnace brazing conditions.

What is claimed is:

1. A heat insulated cylindrical component having a longitudinal axis and adapted for reciprocal axial movement adjacent to a combustion chamber of an internal combustion engine, said chamber having a wall, comprising:
    a metallic body and a ceramic member, said member defining part of said combustion chamber wall, said body has an outwardly opening cavity defined by a planar bottom surface, said ceramic member being disposed within said cavity and having a coaxial recess opening toward said bottom surface and defined by a downwardly converging truncated conical side surface, and
    means to attach said member to said body comprising a coaxial metal connector attached to said body and engaging an adjacent part of said member, said connector constituting a plate complimentary shaped to said downwardly converging truncated conical side surface and being disposed in said recess and secured to said body at said bottom surface, at least part of said connector having a minimum diameter adjacent said cavity planar bottom surface such that said connector radially overlaps the member.

2. The component according to claim 1 in which said connector is a segmented plate shaped to match the shape and dimensions of said recess.

3. A heat insulated piston for an internal combustion engine with a combustion chamber having a wall, said piston having a longitudinal axis, comprising
    a metal body and a ceramic member, said member defining part of said wall,
    said body having an upwardly opening cavity defined by a coaxial side wall and a flat bottom wall,
    said member being disposed in said cavity and having a coaxial recess therein opening toward said bottom wall, said recess being defined by a downwardly conveying truncated concial side wall having a minimum diameter adjacent said cavity bottom wall, and
    a plate secured to said bottom wall and extending upwardly into said recess, said plate engaging said conical wall and locking said member to said body.

4. The piston according to claim 3 in which said plate is segmented and is brazed to said bottom wall.

* * * * *